R. SYMMONDS, Jr.
AUTOMOBILE.
APPLICATION FILED MAR. 11, 1908.

1,020,375.

Patented Mar. 12, 1912.
2 SHEETS—SHEET 1.

Witnesses:
Harry S. Gaither
Ruby V. Nash

Inventor:
Robert Symmonds, Jr.
by Walter H. Chamberlin
his atty

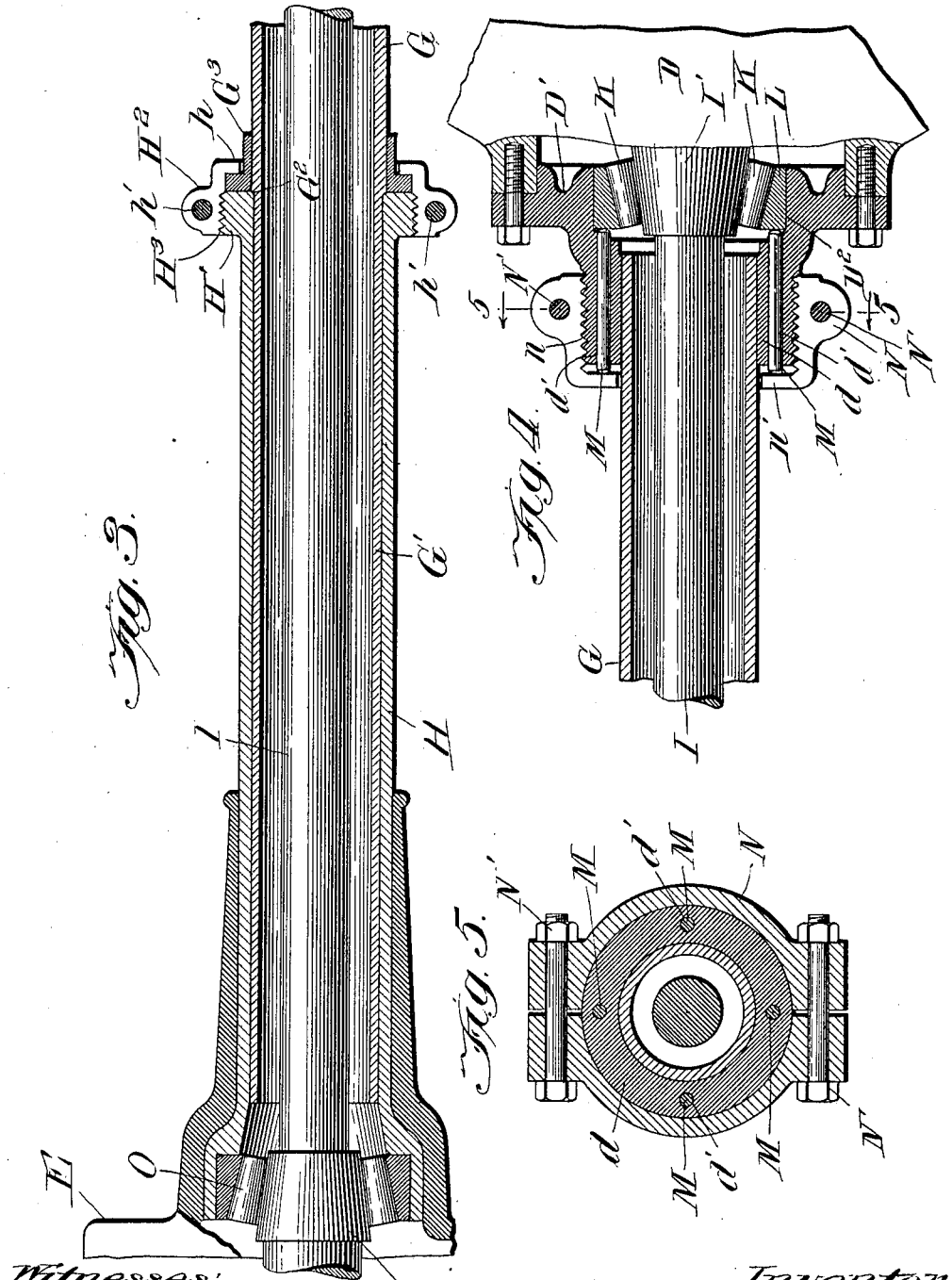

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

AUTOMOBILE.

1,020,375. Specification of Letters Patent. Patented Mar. 12, 1912.

Application filed March 11, 1908. Serial No. 420,320.

*To all whom it may concern:*

Be it known that I, ROBERT SYMMONDS, Jr., a citizen of the United States, residing at Kenosha, county of Kenosha, State of Wisconsin, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

A common driving arrangement for motor driven vehicles consists of a transmission shaft geared to a divided rear axle and extending toward the front of the vehicle to a speed changing mechanism located near the engine or other motor.

The principal object of my invention is to provide an inclosing housing or casing for transmission mechanism of this general character so arranged that the moving parts are effectually protected without being required to carry the weight of the inclosing parts and at the same time the housing serves as a brace for the rear axle without, however, interfering with the movements thereof in a vertical plane whether in a direction at right angles to its axis or in an oscillatory manner due to the relative rise or fall of one wheel with respect to the other.

Figure 1:
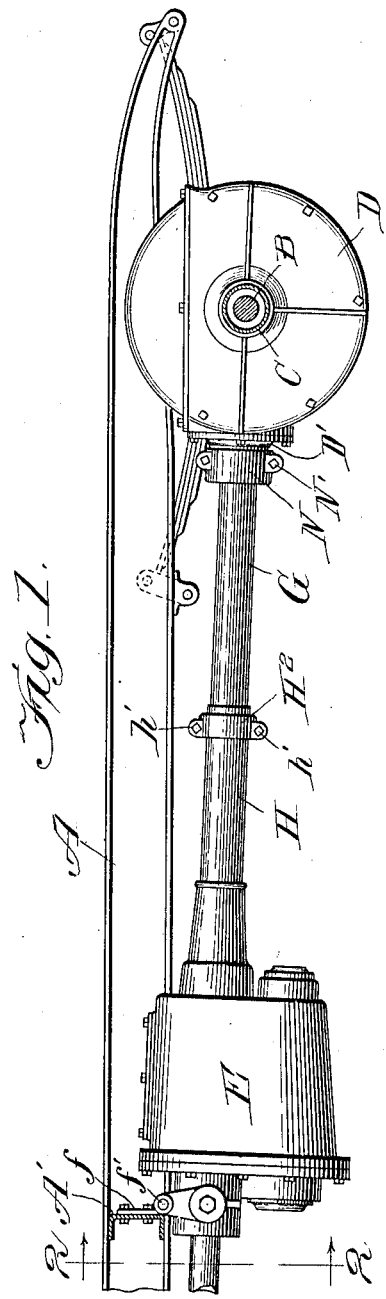
Figure 2:
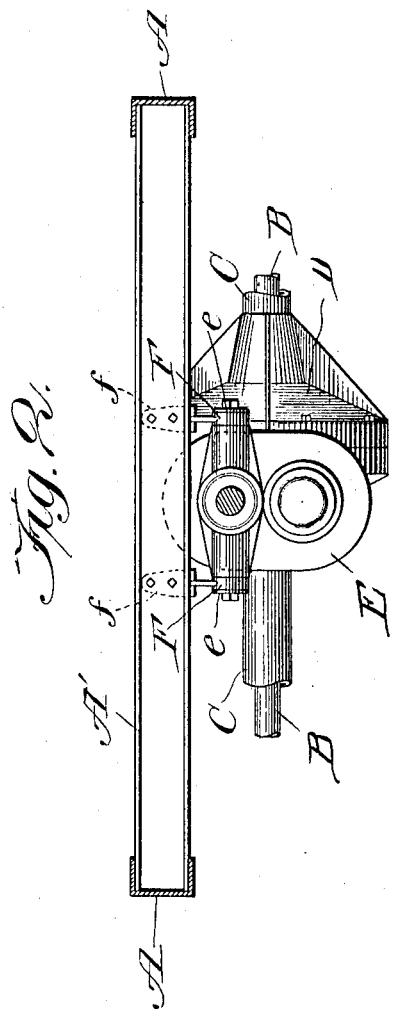

The various features of novelty which characterize my invention will be pointed out with particularity in the appended claims, but for a full understanding of my invention and of its various objects, including the principal object heretofore specified, reference is to be had to the following detailed description taken in connection with the accompanying drawings, wherein:

Figure 1 is a longitudinal section through a portion of an automobile showing in elevation a preferred embodiment of my invention together with the adjacent parts of the frame of the automobile; Fig. 2 is a section taken on line 2—2 of Fig. 1; Fig. 3 is a central longitudinal section of the left hand portion of the housing for the transmission shaft shown in Fig. 1; Fig. 4 is a sectional view similar to Fig. 3 showing the parts of the housing in the vicinity of the rear axle; and Fig. 5 is a section taken on line 5—5 of Fig. 4.

Referring to the drawings, A, A, represent the longitudinal frame members of a vehicle and B is the divided rear axle of any usual construction and surrounded by a pair of stationary sleeves C, C. These sleeves are rigidly united at their inner ends to a casing D which incloses the differential gearing. The gearing itself is not shown since it forms no part of the present invention.

E represents a casing inclosing speed changing mechanism located toward the forward part of the vehicle. The casing E is supported from a transverse frame member A', this member being carried at its opposite ends by the side frames A A. I prefer to mount the casing E in such a manner that it is free to oscillate about an axis parallel with the rear axle but is held against movement in any other direction. To this end the casing may conveniently be provided with a pair of laterally projecting trunnions $e, e$, which are received in the lower ends of a pair of hangers, F, F. These hangers may conveniently be made in the form of hinges the upper halves $f, f$, of which are bolted or otherwise secured to the transverse frame member A', the pivotal axes $f'$ of the hinges being parallel with the axis of the trunnions. The hangers are preferably so arranged that the lower halves thereof can swing in one direction only from the normal position and this may conveniently be accomplished by means of the usual radius rods, (not shown) connected to the rear axle.

G and H are tubes extending toward each other from the casings D and E respectively, one end of each tube being rigidly united to its respective casing by brazing or otherwise. These tubes are connected together in such a manner that they are free to rotate about their common axis independently of each other and at the same time are locked against relative axial movements. The rear axle is therefore free to tilt as for example, when one of the wheels rides over an obstruction or for any other reason rises above or drops below the other wheel, for the rear portion of the complete housing, namely the casing D and the tube G, may rotate relatively to the remaining portions of the housing which are held against rotation. However, the entire housing constituting the members D, E, G and H acts as a single rigid member in the longitudinal direction and serves effectually as a brace for the rear axle.

The tubes G and H may be connected together in various ways to produce the results sought. I prefer, however, to extend one or both of the tubes so that they may be telescoped one within the other throughout a considerable portion of their lengths. This arrangement provides absolute rigidity in the transverse direction so that the two tubes act substantially as a single member under bending stresses. In the construction shown in the drawings the tube G is made long enough to reach from one gear casing to the other so that the whole of the other tube serves as a bearing therefor. That portion of the tube G which is surrounded by the other tube may, if desired, be slightly reduced in diameter as at G' so as to form a shoulder $G^2$ which will abut against the end of the coöperating tube. A collar $G^3$ may be brazed or otherwise secured to the tube G so as to have its front face flush with the shoulder $G^2$, and the tube H may be thickened at its end as at H' so as to provide a wide shoulder to engage with the collar on the other tube.

$H^2$ is a member carried upon the member H' and provided with an inwardly extending flange $h$ which is adapted to engage with the rear face of the collar $G^3$ so as to hold it loosely against the end of the tube H, thereby preventing relative axial movements of the tubes and at the same time permitting relative rotation. The member $H^2$ is preferably in the form of a nut which is screw-threaded upon the member H' as at $H^3$ in order to permit the parts to be accurately adjusted, both initially and in order to take up wear. The member is also preferably split so that the parts thereof may be clamped together as by means of bolts $h'$ in order to securely lock the parts in their adjusted positions.

The rear end of the tube G is preferably attached to a hub $d$ projecting from a cover D' bolted or otherwise secured to the front of the casing D. The bearing for the rear end of the transmission shaft I may be contained within the member D'. In the drawing the transmission shaft is shown as having thereon a truncated cone I' which is supported by a series of rollers K arranged within a bearing ring L. This bearing ring has a sliding fit in a socket $D^2$ in the member D' and, since its bearing surface is conical, the bearing may be adjusted by sliding this ring axially. In order that the bearing may be adjusted conveniently without dismantling the housing I provide a series of pins M which have a sliding fit in channels $d'$ in the hub $d$. These pins are arranged parallel with the transmission shaft and at their inner ends bear against the front face of the bearing ring.

N is a member similar to the member $H^2$ and is screw-threaded upon the hub $d$ as at $n$. An inwardly directed flange $n'$ is adapted to engage with the outer ends of the pins M. It will be seen that by adjusting the member N the pins may be forced inwardly, carrying with them the bearing ring. After the proper adjustment of the bearing is obtained the bolts N' which clamp the two parts of the member N together may be tightened and the bearing ring thereby locked in its adjusted position. It will thus be seen that I have provided an extremely simple arrangement for adjusting the bearing from the exterior thereof. By placing a similar bearing, designated as a whole by the letter O, at the front of the transmission shaft, arranging the cone $I^2$ oppositely, however, with respect to the cone I', both bearings may be adjusted simultaneously because the bearing ring L may be forced inwardly far enough to tighten the bearing at the rear end and also to draw the transmission shaft rearwardly sufficiently to adjust the bearing properly at the opposite end.

While I have illustrated and described in detail a preferred embodiment of my invention I do not desire to be limited to the particular construction and arrangement of parts shown, since my invention contemplates various other forms and arrangements as will be evident from the terms employed in the definitions constituting the appended claims.

Having now fully described my invention, what I claim as new and desire to secure by Letters Patent is:

1. In an automobile, a frame, an axle, a gear casing surrounding the axle, a gear casing mounted on said frame so as to swing about an axis parallel with said axle, a transmission shaft projecting at its ends into said casings, each of said tubes having an external flange, and means for clamping said flanges together so as to prevent relative axial movements of the tubes and at the same time permitting them to rotate relatively to each other.

2. In an automobile, a frame, an axle, a gear casing surrounding said axle, a second gear casing supported from said frame, a transmission shaft having its ends projecting into said casings, a pair of telescoped tubes surrounding said shaft and each rigidly united at one end to one of said casings, each of said tubes having an external flange, and means for clamping said flanges together so as to lock the tubes against relative axial movements while permitting relative rotary movements.

3. In an automobile, a frame, an axle, a gear casing surrounding said axle, a transmission shaft projecting at one end into said casing, a second gear casing surrounding the other end of the shaft, hangers pivoted to said frame so as to swing about an axis parallel with said axle, means for pivotally supporting said second casing upon the free ends of said hangers so as to swing about an axis at right angles to said shaft, and a pair of telescoped tubes surrounding said shaft and each rigidly united at one end to one of said casings, the tubes being so proportioned that one is revoluble within the other.

4. In an automobile, a frame, an axle, a gear casing surrounding said axle, a transmission shaft projecting at one end into said casing, a second gear casing surrounding the other end of the shaft, hangers pivoted to said frame so as to swing about an axis parallel with said axle, means for pivotally supporting said second casing upon the free ends of said hangers so as to swing about an axis at right angles to said shaft, a pair of tubes surrounding said shaft and each rigidly united at one end to one of said casings and extending toward the casing, and means for connecting the free ends of said tubes so as to hold the tubes against relative axial movements while permitting relative rotary movements.

5. In an automobile, a frame, an axle, a gear casing surrounding said axle, a second gear casing, means for pivotally supporting said second casing from the frame so as to swing about two separated axes parallel with said axle, a transmission shaft arranged at right angles to said axle and projecting at its ends into said casing, two tubes surrounding said shaft and each rigidly united to one of the casings, and means for connecting said tubes to each other so as to permit relative rotary movements and prevent relative axial movements.

In testimony whereof, I sign this specification in the presence of two witnesses.

ROBERT SYMMONDS, Jr.

Witnesses:
 MATHIAS MATTSON,
 ED. DIXON.

Copies of this patent may be obtained for five cents each, by addressing the "Commissioner of Patents, Washington, D. C."